US008923435B2

(12) United States Patent
Kim et al.

(10) Patent No.: US 8,923,435 B2
(45) Date of Patent: Dec. 30, 2014

(54) METHOD AND DEVICE FOR GENERATING PRECODING MATRIX IN WIRELESS COMMUNICATION SYSTEM

(75) Inventors: Ki Jun Kim, Anyang-si (KR); Sung Yoon Cho, Anyang-si (KR); Dong Ku Kim, Anyang-si (KR); Jin Young Jang, Anyang-si (KR); Byoung Hoon Kim, Anyang-si (KR); Hyuk Jin Chae, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/880,561

(22) PCT Filed: Sep. 2, 2011

(86) PCT No.: PCT/KR2011/006514
§ 371 (c)(1),
(2), (4) Date: Apr. 19, 2013

(87) PCT Pub. No.: WO2012/053739
PCT Pub. Date: Apr. 26, 2012

(65) Prior Publication Data
US 2013/0202059 A1 Aug. 8, 2013

Related U.S. Application Data

(60) Provisional application No. 61/405,216, filed on Oct. 21, 2010.

(51) Int. Cl.
*H04L 25/49* (2006.01)
*H04B 7/04* (2006.01)
*H04L 25/03* (2006.01)
*H04B 7/06* (2006.01)
*H04L 25/02* (2006.01)
*H04L 5/00* (2006.01)

(52) U.S. Cl.
CPC .......... *H04B 7/0456* (2013.01); *H04L 25/0222* (2013.01); *H04B 7/0478* (2013.01); *H04L 25/03949* (2013.01); *H04B 7/063* (2013.01); *H04L 2025/03414* (2013.01); *H04L 5/0023* (2013.01); *H04L 25/0391* (2013.01)
USPC ............................ 375/296; 375/295; 375/285

(58) Field of Classification Search
CPC .. H04B 3/32; H04L 25/03343; H04L 27/368; H04L 1/0003; H04L 1/0071; H03F 1/3247
USPC ......................................... 375/285, 295–296
See application file for complete search history.

(56) References Cited

U.S. PATENT DOCUMENTS

2008/0292012 A1* 11/2008 Kim et al. ..................... 375/260
2011/0032835 A1* 2/2011 Zhu et al. ..................... 370/252

OTHER PUBLICATIONS

Hwang, D. et al., "Regularized Channel Inversion with Quantized Feedback in Down-link Multiuser Channels," IEEE Transactions on Wireless Communications, vol. 8, No. 12, Dec. 2009, pp. 5785-5789.

(Continued)

*Primary Examiner* — Sam K Ahn
*Assistant Examiner* — Janice Tieu
(74) *Attorney, Agent, or Firm* — Birch, Stewart, Kolasch & Birch, LLP (57) ABSTRACT

Provided is a method and a device for generating a precoding matrix in a wireless communication system. The method for generating the precoding matrix comprises a step of receiving from a terminal feedback including information on the error angle θ of channel direction information (CDI), which indicates the direction of a channel direction vector, and a step of generating the precoding matrix based on the information on the error angle θ of the CDI, wherein the error angle θ of the CDI indicates the angle between the channel direction vector and a quantized channel direction vector, and includes at least one of a channel quantization error component, a channel feedback delay error component, and a channel estimation error component.

15 Claims, 8 Drawing Sheets

(56) References Cited

OTHER PUBLICATIONS

Song, B. et al., "Effects of Imperfect Channel State Information on Achievable Rates of Precoded Multi-user MIMO Broadcast Channels with Limited Feedback," 2009 IEEE International Conference on Communications, Jun. 18, 2009, pp. 1-5.

Trivellato, M. et al., "On Transceiver Design and Channel Quantization for Downlink Multiuser MIMO Systems with Limited Feedback," IEEE Journal on Selected Areas in Communications, vol. 26, No. 8, Oct. 2008, pp. 1494-1504.

* cited by examiner

METHOD AND DEVICE FOR GENERATING PRECODING MATRIX IN WIRELESS COMMUNICATION SYSTEM

CROSS-REFERENCE TO RELATED APPLICATIONS

This application is the National Phase of PCT/KR2011/006514 filed on Sep. 2, 2011, which claims priority under 35 U.S.C. 119(e) to U.S. Provisional Application No. 61/405,216 filed on Oct. 21, 2010, all of which are hereby expressly incorporated by reference into the present application.

BACKGROUND OF THE INVENTION

1. Field of the Invention

The present invention relates to wireless communications, and more specifically to a method and apparatus for generating a precoding matrix in a wireless communication system.

2. Related Art

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

The dirty paper coding scheme, one of MIMO technology, can reduce interference by removing other user's data which act as interference in advance from a transmitting unit, and is known to provide, in theory, maximum channel capacities in MIMO system. Reference can be made to M. H. M. Costa, "Writing on Dirty Paper," IEEE Trans. Inf. Theory, vol. 29, no. 3, pp. 439-441, May 1983, for the technology. The dirty paper coding scheme, however, is difficult to implement in practical system since the scheme requires lots of channel information and presents much complexity in calculation due to the nature of non-linear calculation. Therefore, various alternative methods that can implement the principle of dirty paper coding scheme by using linear calculation have been proposed. Among various alternative methods, a zero-forcing beamforming (ZF-BF) method uses the pseudo inverse matrix of a channel as a precoding matrix of a base station, taking advantage of the property that unit matrix is obtained by multiplying the channel with the precoding matrix. In other words, user pre-processing is carried out in the base station taking consideration of the interference between users. The ZF-BF method has the merit of relatively low complexity in calculation and ease of actual implementation through the use of only linear calculations. Also, the ZF-BF method has the same growth rate of sum rate as that of the DPC method. Since the growth rate of sum rate has meaning only when the number of users is large, however, various methods such as a multiple reception antenna method, a multiple mode transmission method and a multiple user scheduling method have been proposed for improving performance when the number of users is small.

Meanwhile, deterioration in performance can occur in the ZF-BF method when signal-to-noise ratio (SNR) is low. The reason is that noise enhancement occurs when SNR is low since precoder is designed by removing interference signal of other users at the transmission end in the ZF-BF method. To solve this problem, a regularized channel inversion (RCI) method has been proposed. The precoding matrix generated by the conventional ZF-BF method and RCI method can be expressed as follows by Equation 1.

$$G_{ZF} = \alpha'_{ZF}(V^H V)^{-1} V^H \qquad \langle \text{Equation 1} \rangle$$

$$G_{RCI} = \alpha'_{RCI}\left(V^H V + \frac{K}{\rho} I_K\right)^{-1} V^H$$

In Equation 1, $V = [V_1^T, V_2^T, \ldots, V_K^T]^T$ is channel direction information (CDI) which is fed back, $\alpha'_{ZF}$ and $\alpha'_{RCI}$ are normalization constants for fulfilling the transmission power constraint of the base station, and $\rho$ represents SNR. In other words, the precoding matrix $G_{RCI}$ generated by the RCI method is generated considering the generated SNR, thereby solving the problems of the ZF-BF problems to some degree.

The ZF-BF method and the RCI method described above assume the case of perfect channel, and presents optimal performance when SNR is high. When channel error exists, however, the ZF-BF method and the RCI method have problem in performing optimally. Therefore, there needs to propose methods of precoding that can provide improved performance when channel error exists.

SUMMARY OF THE INVENTION

The present invention provides a method and apparatus for generating a precoding matrix in a wireless communication system. The present invention proposes a method and apparatus for generating a precoding matrix taking consideration of channel error in a downlink (DL) in a multiple-input multiple-output (MIMO) system.

In an aspect, a method of generating a precoding matrix in a wireless communication system is provided. The method includes receiving a feedback including information on an error angle $\theta$ of channel direction information (CDI) which indicates a direction of channel direction vector from a terminal, and generating a precoding matrix based on the information on the error angle $\theta$ of the CDI. The error angle $\theta$ of the CDI indicates an angle between the channel direction vector and a quantized channel direction vector, and the error angle $\theta$ of the CDI includes at least one of a channel quantization error component, a channel feedback delay error component and a channel estimation error component.

The information on the error angle $\theta$ of the CDI may be cos $\theta$ calculated per each feedback period in which the feedback is transmitted, and the cos $\theta$ may be transmitted per each feedback period.

The precoding matrix may be generated based on the cos $\theta$ by Equation $$G_{CDI,SNR,\cos\theta} = \alpha'_2\left(V^H D_V^2 V + D_E^2 \frac{1}{N_t - 1}(K I_{N_t} - V^H V) + \frac{\sigma^2}{\rho} D_{\|h\|}^{-2}\right)^{-1} V^H D_V^H,$$

where $\alpha_2'$ is a power normalization factor, $V = [v_1^T, v_2^T, \ldots, v_K^T]^T$ is a channel quantization vector matrix of the channel direction vector according to a quantization, $D_V$ is a diagonal matrix whose (k,k)th element is cos $\theta$, $D_E$ is a diagonal matrix whose (k,k)th element is sin $\theta$, Nt is a number of transmission antennas of a base station, K is a number of users using a single reception antenna, $I_{Nt}$ is a unit matrix, $\sigma^2$ is a covariance of a noise matrix, P is a transmit power constraint (TPC), $D_{\|h\|}$ is a diagonal matrix whose (k,k)th element is $\|h_k\|$, $h_k$ is a channel vector of $k^{th}$ user, and $(.)^H$ is a Hermitian calculation.

The information on the error angle θ of the CDI may be an average value of cos θ over a long period longer than a feedback period in which the feedback is transmitted, and the average value of cos θ may be transmitted per the long period.

The precoding matrix may be generated based on the cos θ by Equation $$G_{CDI,SNR,\cos\theta} = \alpha'_3 \left( V^H \mathbb{E}(D_V^2) V + \mathbb{E}(D_E^2) \frac{1}{N_t - 1} (KI_{N_t} - V^H V) + \frac{\sigma^2}{P} D_{\|h\|}^{-2} \right)^{-1} V^H \mathbb{E}(D_V^H),$$

where $\alpha_3'$ is a power normalization factor, $V=[v_1^T, v_2^T, \ldots, v_K^T]^T$ a channel quantization vector matrix of the channel direction vector according to a quantization, $D_V$ is a diagonal matrix whose (k,k)th element is cos θ, $D_E$ is a diagonal matrix whose (k,k)th element is sin θ, Nt is a number of transmission antennas of a base station, K is a number of users using a single reception antenna, $I_{N_t}$ is a unit matrix, $\sigma^2$ is a covariance of a noise matrix, P is a transmission power constraint, $D_{\|h\|}$ is a diagonal matrix whose (k,k)th element is $\|h_k\|$, $h_k$ is a channel vector of $k^{th}$ user, E(.) is an expectation, and $(.)^H$ is a Hermitian calculation.

The channel direction vector and the quantized channel direction vector may have a relationship of Equation $\tilde{h}_k$=cos $\theta_k \cdot v_k$+sin $\theta_k \cdot e_k$, where $\tilde{h}_k$ is a channel direction vector on $k^{th}$ user, $v_k$ is a quantized channel direction vector on $k^{th}$ user, $e_k$ is an error vector on $k^{th}$ user, and $\theta_k$ is an error angle on $k^{th}$ user.

The channel quantization error component may be calculated by Equation $\theta_{quantization}=\cos^{-1}|\hat{h}_k^H v_k|$, where $\hat{h}_k$ is a channel estimated by $k^{th}$ user at reception end, $v_k$ is a codebook vector of a user, and $(.)_H$ is a Hermitian calculation.

The channel feedback delay error component may be calculated by Equation $\theta_{delay}=\cos^{-1} J_0(2\pi f_d D T_s)$, where $f_d$ is a Doppler frequency of the terminal, D is a feedback time delay, and $T_s$ is a symbol period.

The channel estimation error component may be calculated by Equation $\theta_{estimation-error}=f(\lambda,SNR)$, where λ is pilot density and SNR is a signal-to-noise ratio.

In another aspect, an apparatus for generating a precoding matrix in a wireless communication system is provided. The apparatus includes a radio frequency (RF) unit for transmitting or receiving a wireless signal, and a processor connected to the RF unit, and configured for receiving a feedback including information on an error angle θ of channel direction information (CDI) which indicates a direction of channel direction vector from a terminal, and generating a precoding matrix based on the information on the error angle θ of the CDI. The error angle θ of the CDI indicates an angle between the channel direction vector and a quantized channel direction vector, and the error angle θ of the CDI includes at least one of a channel quantization error component, a channel feedback delay error component and a channel estimation error component.

By generating a precoding matrix considering channel error, the performance of precoding can be improved.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Figure 1:
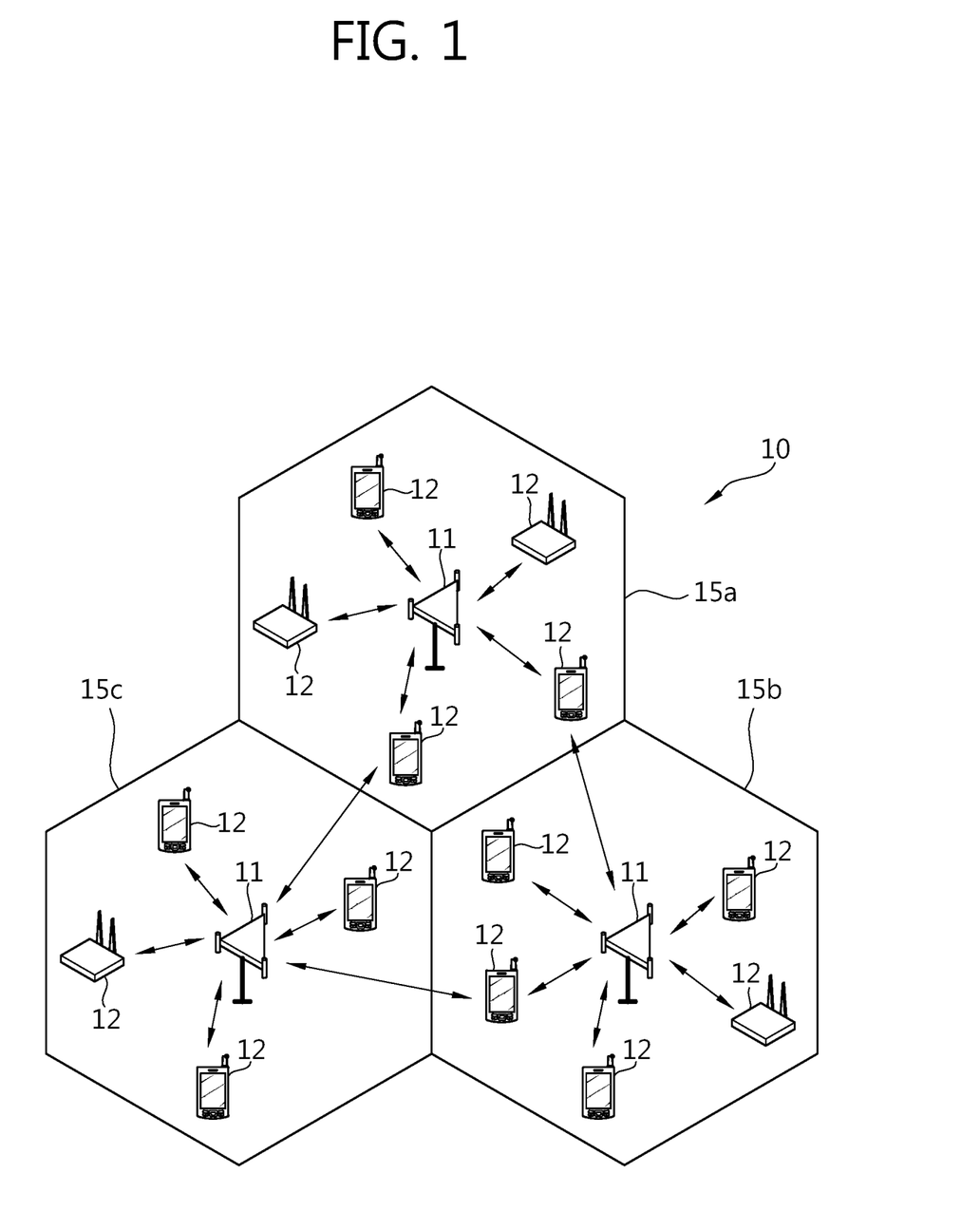
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

In the description below, a downlink MIMO system in which one base station in a single cell transmits information to total of K users is assumed. The base station is assumed to have $N_T$ transmission antennas and each user is assumed to have a single reception antenna, with $K \leq N_T$. The transmission signal is transmitted through the process of precoding, which can be expressed by using a matrix as in Equation 2.

$$y = HGx + n \qquad \text{<Equation 2>}$$

In Equation 2, $x = [x_1, x_2, \ldots, x_k]^T$ is a transmission signal vector, $H = [h_1^T, h_2^T, \ldots, h_L^T]^T$ is a channel matrix, $h_i \in \mathbb{C}^{1 \times NT}$ is $i^{th}$ user's channel vector, $G \in \mathbb{C}^{NT \times K}$ is a precoding matrix generated in the precoding process, $y = [y_1, y_2, \ldots, y_k]^T$ is a reception signal vector, and $n \in \mathbb{C}^{K \times 1}$ is a white noise vector with average of 0, covariance of $\sigma^2 I$. $(.)^T$ represents transpose calculation.

The precoding matrix G can be determined by the channel feedback information transmitted from the terminal. The channel feedback information can comprise channel direction information (CDI) vector which is channel direction information, and channel quality information (CQI) scalar which is channel quality information. Here, the CDI vector is assumed that vector index is only fed back by vector quantization (VQ). The codebook for VQ is $C = \{c_1, \ldots, c_N\}$, and $N = 2^B$ is assumed to be known to transmission end and reception end. N is the size of codebook, and B is the number of bits representing the CDI feedback vector. Also, it is assumed that there is no feedback error for CQI scalar.

The codebook index fed back by VQ can be defined by Equation 3 as follows.

$$n = \arg\max_{1 \leq j \leq N} |\tilde{h}_k c_j^H| \qquad \text{<Equation 3>}$$

In Equation 3, $\tilde{h}_k = h_k / \|h_k\|$ is a channel direction vector, and $(.)^H$ represents the Hermitian calculation. The channel direction vector can be expressed by Equation 4 as follows.

$$\tilde{h}_k = \cos\theta_k \cdot v_k + \sin\theta_k \cdot e_k \qquad \text{<Equation 4>}$$

Figure 2:
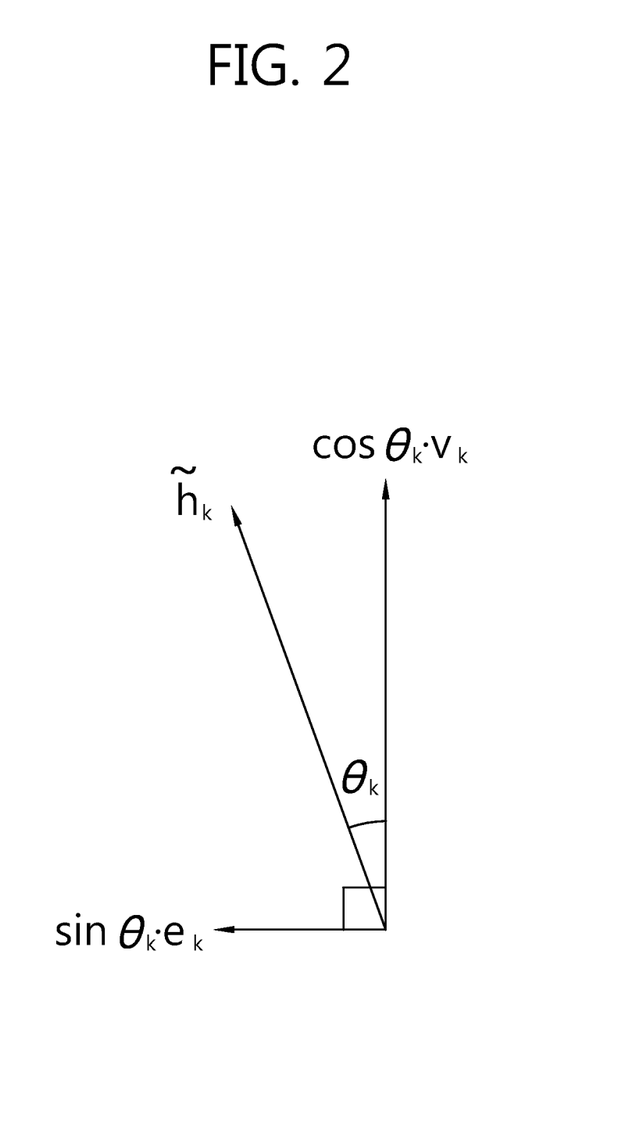
FIG. 2 shows a decomposition of a channel direction vector by using a channel quantization vector $v_k$ and an error vector $e_k$·a FIG. 3 shows an example of a method of generating a precoding matrix according to an embodiment of the present invention.

FIG. 2 shows a decomposition of a channel direction vector by using a channel quantization vector $v_k$ and an error vector $e_k$. In Equation 4, $v_k$ represents the channel quantization vector defined by Equation 3, and $e_k$ represents the error vector. $e_k$ is perpendicular to $v_k$, and $\cos\theta_k = |\tilde{h}_k v_k^H|$. In other words, $\theta_k$ represents the error angle. The error of the channel can occur due to estimation error of current channel, feedback delay of channel information or channel quantization.

By substituting Equation 4 into Equation 2, the relation of Equation 5 can be obtained.

$$y = D_{\|h\|}(D_V V + D_E E)Gx + n \qquad \text{<Equation 5>}$$

In Equation 5, $D_{\|h\|}$ is the diagonal matrix with its (k,k)th element $\|h_k\|$, $D_V$ is the diagonal matrix with its (k,k)th element $\cos\theta_k$, $V = [v_1^T, v_2^T, \ldots, v_K^T]^T$ is the channel quantization vector matrix by quantization, $D_E$ is the diagonal matrix with its (k,k)th element $\sin\theta_k$, and $E = [e_1^T, e_2^T, \ldots, e_K^T]^T$ is the error vector matrix by quantization.

Meanwhile, the definition of Equation 6 can be considered in the following description.

$$E_\theta(EV^H) = 0_{K \times K} \qquad \text{<Equation 6>}$$

$E[.]$ represents expectation. Due to orthogonality, $e_k v_k^H = 0$. Also, the channel quantization vector and error vector of different users are independent since channels of different users are independent. In other words, $E_\theta(e_i v_j^H) = 0$ for $i \neq j$.

The precoder should satisfy the transmit power constraint (TPC) condition of Equation 7 due to transmit power constraint.

$$E[x^H G^H Gx] \leq tr(G^H G) \leq P \qquad \text{<Equation 7>}$$

In Equation 7, $tr(.)$ represents trace calculation. Based on the information fed back from the terminal, optimized precoding matrix minimizing a mean squared error (MSE) can be calculated by Equation 8.

$$G_{opt} = \underset{\substack{tr(G^H G) \leq P \\ \alpha \in \mathbb{R}_+}}{\operatorname{argmin}} \mathbb{E}\left[\|\alpha(D_V V + D_E E)Gx + \alpha D_{\|h\|}^{-1} n - x\|_2^2 \mid FB\ info.\right] \qquad \text{<Equation 8>}$$

Assuming that generally $tr(G^H G) = P$ and transmission signal x and noise signal n is independent in the TPC of Equation 7, the right hand side of Equation 8 can be represented again as Equation 9.

$$\underset{\substack{tr(G^H G) = P \\ \alpha \in \mathbb{R}_+}}{\operatorname{argmin}} \mathbb{E}[\|\alpha(D_V V + D_E E)Gx - x\|_2^2 \mid FB\ info.] + \qquad \text{<Equation 9>}$$

$$\mathbb{E}[\alpha^2 tr(D_{\|h\|}^{-2} nn^H) \mid FB\ info.]$$

To solve Equation 9, Equation 9 can be transformed as in Equation 10 by setting $T = \alpha G$ and by using $tr(G^H G)/P = 1$.

$$T_{opt} = \underset{\substack{tr(T^H T) = \alpha^2 P \\ \alpha \in \mathbb{R}_+}}{\operatorname{argmin}} \mathbb{E}[\|(D_V V + D_E E)Tx - x\|_2^2 \mid FB\ info.] + \qquad \text{<Equation 10>}$$

$$\frac{1}{P} tr(T^H T) \mathbb{E}[tr(D_{\|h\|}^{-2} nn^H) \mid FB\ info.]$$

Since $\alpha$ is a positive real number in Equation 10, Equation 10 can be considered the problem of unconstrained optimization. Referring to Equation 10, expectation varies according to the feedback information.

When the feedback information is SNR and CDI, the base station can't know the error of the channel, so can generate the precoding matrix by estimating error. Assuming the error of the channel is present in quantization error, the channel has no spatially correlation, and if use of random codebook is assumed, the average of error can be represented as in Equation 11.

$$\mathbb{E}_\theta(D_V^2)\mathbb{E}_\theta(\cos^2\theta) \cdot I_K = \left(1 - 2^B \beta\left(2^B, \frac{N_t}{N_t-1}\right)\right) \cdot I_K \quad \langle \text{Equation 11} \rangle$$

In Equation 11, $\beta(a,b) = \int_0^1 t^{a-1}(1-t)^{b-1} dt$.

Meanwhile, the formula of argmin in Equation 10 can be rearranged is in Equation 12.

$$\mathbb{E}[\|(D_V V + D_E E)Tx - x\|_2^2 \mid FB\ info.] + \quad \langle \text{Equation 12} \rangle$$

$$\frac{1}{P}tr(T^H T)\mathbb{E}[tr(D_{\|h\|}^{-2}nn^H) \mid FB\ info.] \stackrel{(a)}{=}$$

$$\mathbb{E}_{\theta,\|h\|}[\mathbb{E}_x[tr((D_V V + D_E E)Txx^H T^H (V^H D_V^H + E^H D_E^H))]] +$$

$$\mathbb{E}_{\theta,\|h\|}[\mathbb{E}_x[2\text{Re}\{tr((D_V V + D_E E)Txx^H)\}]] +$$

$$\mathbb{E}_x(xx^H) + \frac{1}{P}tr(T^H T)\mathbb{E}_n[tr(D_{\|h\|}^{-2}nn^H)] \stackrel{(b)}{=}$$

$$tr((V^H \mathbb{E}_\theta(D_V^2)V + \mathbb{E}_\theta(E^H D_E^2 E))TT^H) + 2\text{Re}$$

$$\{tr((\mathbb{E}_\theta(D_V)V + \mathbb{E}_\theta(D_E E))T)\} + I_K + \frac{\sigma^2}{P}tr(T^H T)D_{\|h\|}^{-2}$$

In Equation 12, the process (a) can be expanded by using the formula $\|A\|_2^2 = tr(AA^H)$, $tr(ABC) = tr(CAB)$ and the lemma of Equation 6. In Equation 12, the process (b) can use the relation $\mathbb{E}_x(xx^H) = I^K$.

Also, in Equation 12, $\mathbb{E}_\theta(E^H D_E^2 E)$ can be derived as follows. The error vector $e_i$ is always perpendicular to the channel quantization vector $v_i$. In other words, $e_i$ can be a projection for a random $v_i$ in null space. In other words, this can be represented as in Equation 13.

$$e_i^H = \delta P_{v_i} s = \frac{1}{\sqrt{N_t-1}}(I_{N_t} - v_i^H v_i)s \quad \langle \text{Equation 13} \rangle$$

In Equation 13, $P_{v_i}$ is a projection matrix of $v_i$ in null space. The vector s is a unit norm random vector having isotropic distribution. The scaling factor $$\delta = \frac{1}{\sqrt{N_t-1}}$$

is for power normalization. $\mathbb{E}_\theta(E^H D_E^2 E)$ can be arranged as in Equation 14 by using Equation 13.

$$\mathbb{E}_\theta(E^H D_E^2 E) = \mathbb{E}(\sin^2\theta)\mathbb{E}(E^H E) \quad \langle \text{Equation 14} \rangle$$

$$= \sum_{i=1}^K \mathbb{E}(\sin^2\theta) e_i^H e_i$$

$$= \frac{2^B \beta\left(2^B, \frac{N_t}{N_t-1}\right)}{N_t - 1} \sum_{i=1}^K (I_{N_t} - v_i^H v_i)\mathbb{E}(ss^H)(I_{N_t} - v_i^H v_i)$$

$$= \frac{2^B}{N_t-1} \cdot \beta\left(2^B, \frac{N_t}{N_t-1}\right) \cdot (KI_{N_t} - V_V^H)$$

By substituting Equation 14 into Equation 12, and substituting this into Equation 9 and Equation 10, and then arranging the equation, the precoding matrix can be expressed as in Equation 15.

$$G_{CDI,SNR} = \quad \langle \text{Equation 15} \rangle$$

$$\alpha_1'\left(\omega V^H V + \frac{1-\omega}{N_t-1}(KI_{N_t} - V^H V) + \frac{\sigma^2}{P}D_{\|h\|}^{-2}\right)^{-1} V^H$$

In Equation 15, $w = 1 - 2^B \beta(2^B, N_t/(N_t-1))$, and $\alpha_1'$ is power normalization factor.

The precoding matrix generated by Equation 15 is the precoding matrix generated based on CDI and SNR when the feedback information is CDI and SNR. In other words, the base station can generate precoding matrix by using estimated average error angle. However, this matrix cannot be a correctly calculated precoding matrix since spatial correlation of the channel, channel estimation error or channel delay has not been considered. Also, codebook is not randomly defined in actual communication environment and there exists spatial correlation of the channel. Therefore, it is difficult for the base station to estimate the error angle correctly. So, the method of generating correct precoding matrix through additional feedback of information on the error angle can be proposed.

Figure 3:
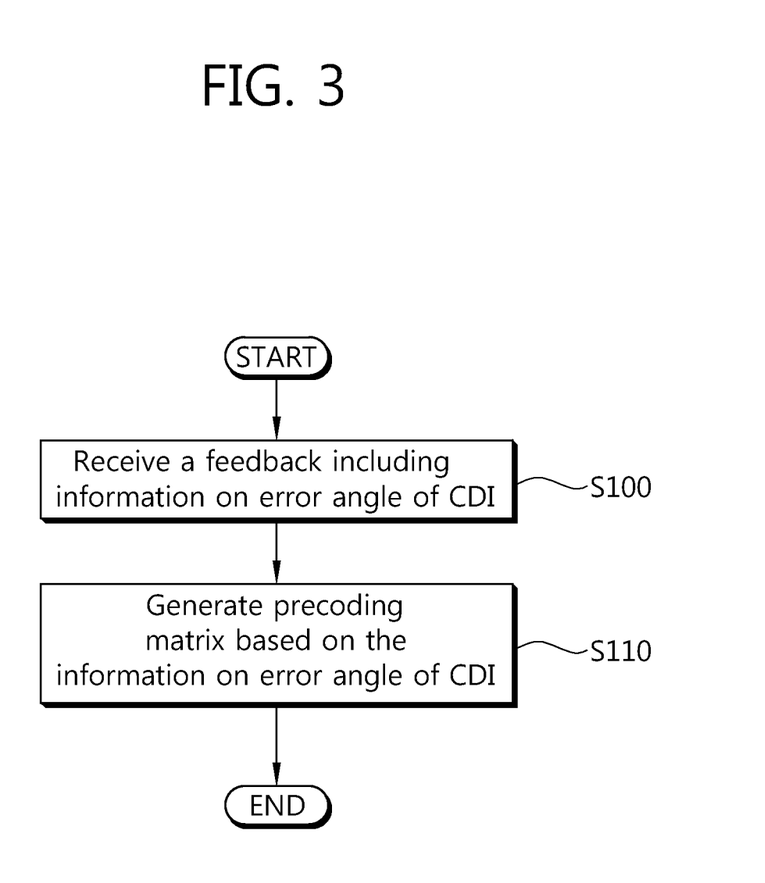

FIG. 3 shows an example of a method of generating a precoding matrix according to an embodiment of the present invention.

Referring to FIG. 3, in step S100, the base station receives a feedback including information on the error angle θ of the CDI from terminal. In step S110, the base station generates a precoding matrix based on the information on the error angle θ of the CDI.

The information on the error angle θ of the CDI received by the base station can be Cos θ calculated per each feedback period. The precoding matrix thus generated can be represented as in Equation 16.

$$G_{CDI,SNR,\cos\theta} = \quad \langle \text{Equation 16} \rangle$$

$$\alpha_2'\left(\begin{array}{c} V^H D_V^2 V + D_E^2 \frac{1}{N_t-1}(KI_{N_t} - V^H V) + \\ \frac{\sigma^2}{P}D_{\|h\|}^{-2} \end{array}\right)^{-1} V^H D_V^H$$

In Equation 16, $\alpha_2'$ is a power normalization factor.

Otherwise, the information on the error angle θ of the CDI received by the base station can be the average of cos θ calculated per each feedback period. The average of cos θ can be fed back with longer period compared to general feedback period. By using the average, the signaling overhead of feedbacking cos θ for every feedback period can be reduced. When average of cos θ is fed back, the precoding matrix can be represented as in Equation 17.

$$G_{CDI,SNR,\cos\theta} = \quad \text{(Equation 17)}$$

$$\alpha_3' \left( \mathbb{E}(D_E^2) \frac{1}{N_t - 1}(KI_{N_t} - V^H V) + \frac{\sigma^2}{P} D_{\|\tilde{h}\|}^{-2} \right)^{-1} V^H \mathbb{E}(D_V^H)$$

In Equation 17, $\alpha_3'$ is a power normalization factor. Equation 17 represents the form where $D_V$ and $D_E$ in Equation 16 is replaced with expectations $\mathbb{E}(D_V)$ and $\mathbb{E}(D_E)$.

Meanwhile, the error angle θ of the CDI can comprise three components of channel quantization error, channel feedback delay error and channel estimation error. The channel quantization error can be calculated by using the distance between the channel and codebook at reception end. Equation 18 represents the formula for calculating channel quantization component from error angle θ of the CDI.

$$\theta_{quantization} = \cos^{-1}|\tilde{h}_k^H v_k| \qquad \text{<Equation 18>}$$

In Equation 18, $\tilde{h}_k$ is the channel estimated by $k^{th}$ user at reception end, and $v_k$ is the codebook vector of the user.

The channel feedback delay error component from the error angle θ of the CDI can be calculated by Equation 19.

$$\theta_{delay} = \cos^{-1} J_0(2\pi f_d D T_S) \qquad \text{<Equation 19>}$$

In Equation 19, $f_d$ represents a Doppler frequency of the terminal, D is the feedback time delay, and $T_S$ is the symbol period.

The channel estimation error component of error angle θ of the CDI can be represented as the function of pilot density and SNR. This can be calculated by Equation 20.

$$\theta_{estimation-error} = f(\lambda, SNR) \qquad \text{<Equation 20>}$$

The error angle θ of the CDI can be calculated by adding all three components as in Equation 21. The terminal can feedback the information on the error angle θ of the CDI which is finally calculated to the base station.

$$\theta = \theta_{quantization} + \theta_{delay} + \theta_{estimation-error} \qquad \text{<Equation 21>}$$

FIGS. 4-7 are graphs showing results of comparison between a method for generating a precoding matrix according to an embodiment of the present invention and conventional method.

Figure 4:
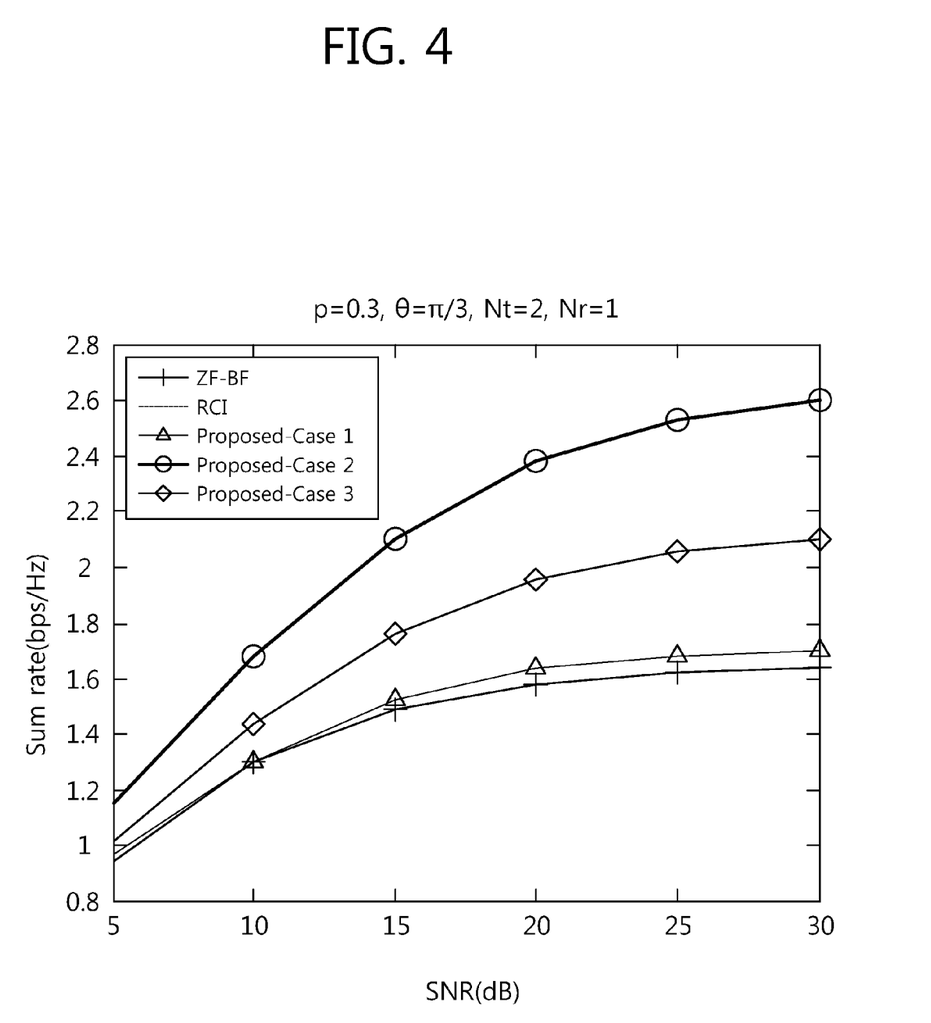
FIGS. 4-7 are graphs showing results of comparison between a method for generating precoding matrix according to an embodiment of the present invention and conventional method.

The experimental environment for comparing the performance of proposed method for generating a precoding matrix and conventional method is described below. As for the codebook for channel quantization, the codebook of $3^{rd}$ generation partnership project (3GPP) long term evolution (LTE) is used, and the spatial correlation value among adjacent antennas of the base station is assumed to be 0.3. In the graphs of FIGS. 4-7, case 1 represents the case where a precoding matrix is generated by receiving feedback of the SNR and the CDI. Case 2 represents the case where a precoding matrix is generated based on the information on error angle θ other than the SNR and the CDI, which is received at each feedback period. Case 3 represents the case where a precoding matrix is generated by receiving feedback of the SNR, the CDI and the information on error angle θ, the feedback being the average value of 100 error angles of a short-term channel. Also, FIGS. 4 and 6 show the comparison of average sum rate in the case where the number of transmission antennas of the base station is 2 and 4 respectively when channel feedback delay error or channel estimation error is relatively large ($\theta_{delay} + \theta_{estimation-error} = \pi/3$), and FIGS. 5 and 7 the comparison of average sum rate in the case where the number of transmission antennas of the base station is 2 and 4 respectively when channel feedback delay error or channel estimation error is relatively small ($\theta_{delay} + \theta_{estimation-error} = \pi/24$).

Figure 5:
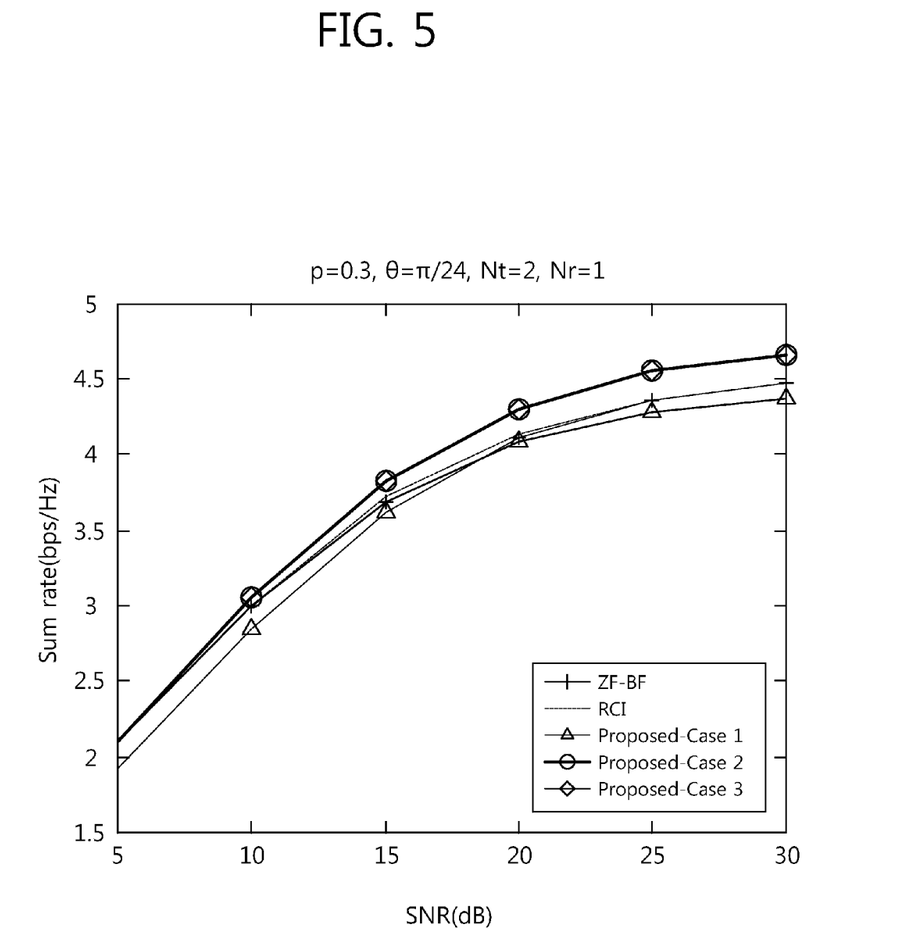
Figure 6:
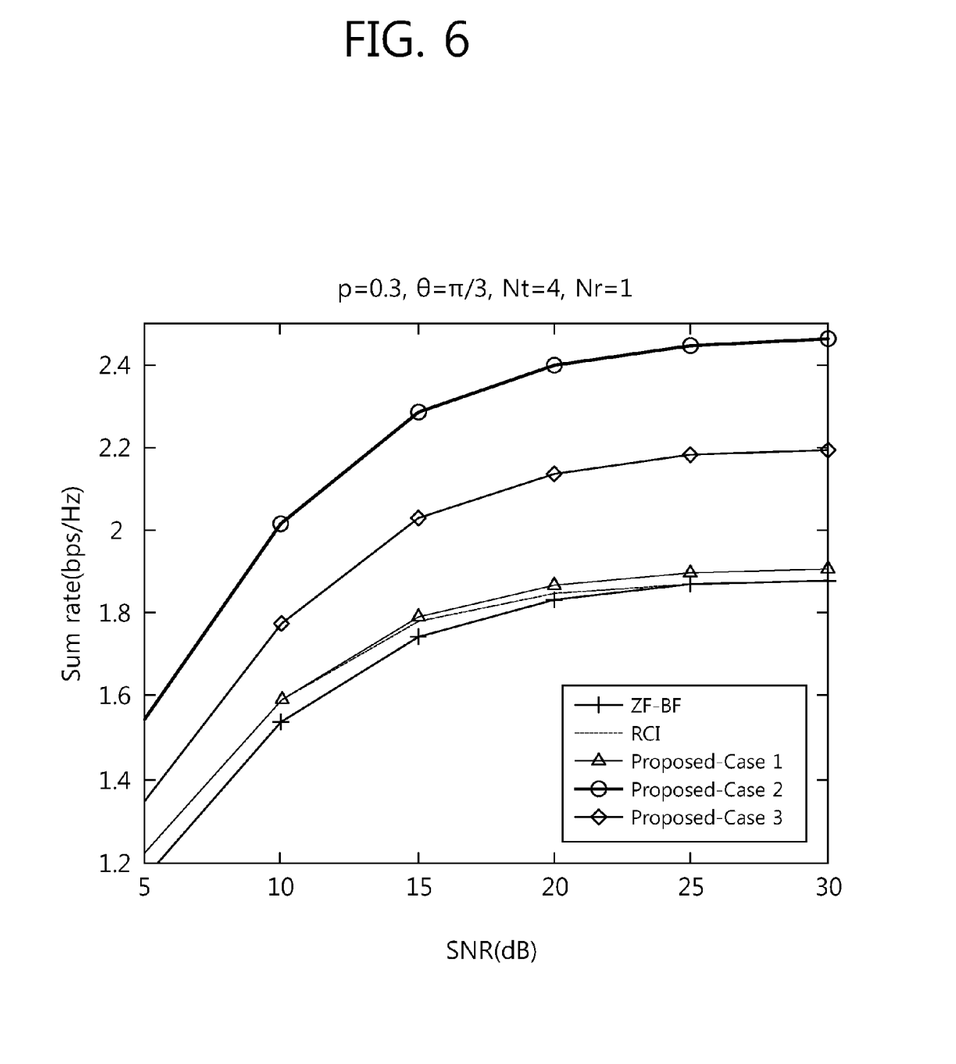
Figure 7:
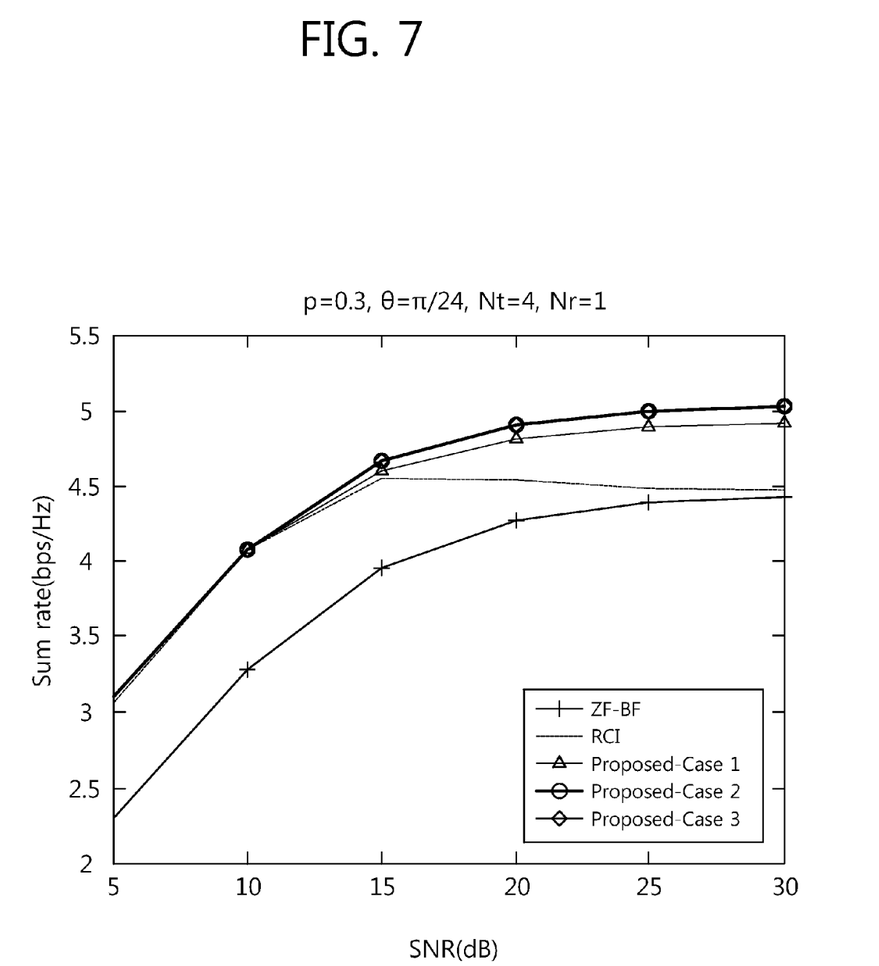

Referring to FIGS. 4-7, it can be confirmed that a method of generating a precoding matrix according to an embodiment of the present invention presents more excellent sum rate compared to the conventional ZF-BF method or the RCI method. Especially, it can be seen that the gain in sum rate is larger in proposed method in the case where channel feedback delay error or channel estimation error is relatively large as shown in FIGS. 4 and 6 compared to the case where channel feedback delay error or channel estimation error is relatively small as shown in FIGS. 5 and 7. Comparing case 2 and case 3 in FIGS. 4-7, sum rate gain is larger in case 2 since a precoding matrix is generated by feedbacking the information on the error angle of CDI at each feedback period, whereas efficiency is better in case 3 compared to case 2 since a precoding matrix is generated based on the information on the error angle of CDI averaged for relatively long period. Also, it can be seen that sum rate gain is relatively small in case 1 compared to conventional methods since a precoding matrix is generated by estimating error angle of CDI without feedbacking the information.

Figure 8:
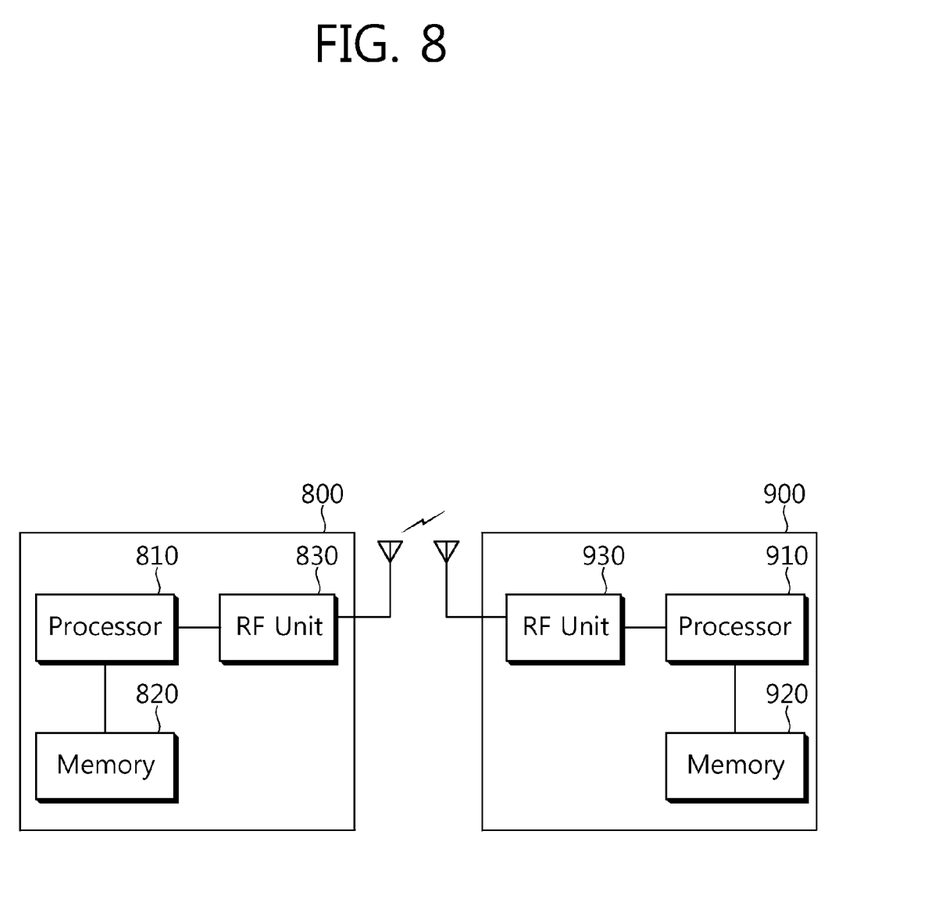
FIG. 8 is a block diagram showing wireless communication system to implement an embodiment of the present invention.

FIG. 8 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of generating a precoding matrix in a wireless communication system, the method comprising:

receiving a feedback including information on an error angle θ of channel direction information (CDI) which indicates a direction of channel direction vector from a terminal, and generating a precoding matrix based on the information on the error angle θ of the CDI, wherein the error angle θ of the CDI indicates an angle between the channel direction vector and a quantized channel direction vector, wherein the error angle θ of the CDI includes at least one of a channel quantization error component, a channel feedback delay error component and a channel estimation error component, and wherein the channel direction vector and the quantized channel direction vector have a relationship of Equation below:

$\tilde{h}_k = \cos\theta_k \cdot v_k + \sin\theta_k \cdot e_k$, where $\tilde{h}_k$ is the channel direction vector on $k^{th}$ user, $v_k$ is the quantized channel direction vector on $k^{th}$ user, $e_k$ is an error vector on $k^{th}$ user, and $\theta_k$ is the error angle on $k^{th}$ user.

2. The method of claim 1, wherein the information on the error angle θ of the CDI is cos θ calculated per each feedback period in which the feedback is transmitted, and wherein the cos θ is transmitted per each feedback period.

3. The method of claim 2, wherein the precoding matrix is generated based on the cos θ by Equation below:

$$G_{CDI,SNR,\cos\theta} = \alpha_2' \left( V^H D_V^2 V + D_E^2 \frac{1}{N_t - 1}(KI_{N_t} - V^H V) + \frac{\sigma^2}{P} D_{\|h\|}^{-2} \right)^{-1} V^H D_V^H,$$

where $\alpha_2'$ is a power normalization factor, $V=[v_1^T, v_2^T, \ldots, v_K^T]^T$ is a channel quantization vector matrix of the channel direction vector according to a quantization, $D_V$ is a diagonal matrix whose (k,k)th element is cos θ, $D_E$ is a diagonal matrix whose (k,k)th element is sin θ, Nt is a number of transmission antennas of a base station, K is a number of users using a single reception antenna, $I_{Nt}$ is a unit matrix, $\sigma^2$ is a covariance of a noise matrix, P is a transmit power constraint (TPC), $D_{\|h\|}$ is a diagonal matrix whose (k,k)th element is $\|h_k\|$, $h_k$ is a channel vector of $k^{th}$ user, and $(.)^H$ is a Hermitian calculation.

4. The method of claim 1, wherein the information on the error angle θ of the CDI is an average value of cos θ over a long period longer than a feedback period in which the feedback is transmitted, and wherein the average value of cos θ is transmitted per the long period.

5. The method of claim 4, wherein the precoding matrix is generated based on the cos θ by Equation below:

$$G_{CDI,SNR,\cos\theta} = \alpha_3' \left( V^H \mathbb{E}(D_V^2) V + \mathbb{E}(D_E^2) \frac{1}{N_t - 1}(KI_{N_t} - V^H V) + \frac{\sigma^2}{P} D_{\|h\|}^{-2} \right)^{-1} V^H \mathbb{E}(D_V^H),$$

where $\alpha_3'$ is a power normalization factor, $V=[v_1^T, v_2^T, \ldots, v_K^T]^T$ a channel quantization vector matrix of the channel direction vector according to a quantization, $D_V$ is a diagonal matrix whose (k,k)th element is cos θ, $D_E$ is a diagonal matrix whose (k,k)th element is sin θ, Nt is a number of transmission antennas of a base station, K is a number of users using a single reception antenna, $I_{Nt}$ is a unit matrix, $\sigma^2$ is a covariance of a noise matrix, P is a transmission power constraint, $D_{\|h\|}$ is a diagonal matrix whose (k,k)th element is $\|h_k\|$, $h_k$ is a channel vector of $k^{th}$ user, E(.) is an expectation, and $(.)^H$ is a Hermitian calculation.

6. The method of claim 1, wherein the channel quantization error component is calculated by Equation below:

$\theta_{quantization} = \cos^{-1}|\hat{h}_k^H v_k|$, where $\hat{h}_k$ is a channel estimated by $k^{th}$ user at reception end, $v_k$ is a codebook vector of a user, and $(.)^H$ is a Hermitian calculation.

7. An apparatus for generating a precoding matrix in a wireless communication system, the apparatus comprising a radio frequency (RF) unit for transmitting or receiving a wireless signal; and a processor connected to the RF unit, and configured to:
receive a feedback including information on an error angle θ of channel direction information (CDI) which indicates a direction of channel direction vector from a terminal, and generate a precoding matrix based on the information on the error angle θ of the CDI, wherein the error angle θ of the CDI indicates an angle between the channel direction vector and a quantized channel direction vector, wherein the error angle θ of the CDI includes at least one of a channel quantization error component, a channel feedback delay error component and a channel estimation error component, and wherein the channel direction vector and the quantized channel direction vector have a relationship of Equation below:

$\tilde{h}_k = \cos\theta_k \cdot v_k + \sin\theta_k \cdot e_k$, where $\tilde{h}_k$ is the channel direction vector on $k^{th}$ user, $v_k$ is the quantized channel direction vector on $k^{th}$ user, $e_k$ is an error vector on $k^{th}$ user, and $\theta_k$ is the error angle on $k^{th}$ user.

8. The apparatus of claim 7, wherein the information on the error angle θ of the CDI is cos θ calculated per each feedback period in which the feedback is transmitted, and wherein the cos θ is transmitted per each feedback period.

9. The apparatus of claim 8, wherein the precoding matrix is generated based on the cos θ by Equation below:

$$G_{CDI,SNR,\cos\theta} = \alpha'_3 \left( \begin{array}{c} V^H \mathbb{E}(D_V^2)V + \\ \mathbb{E}(D_E^2) \frac{1}{N_t - 1}(KI_{N_t} - V^H V) + \\ \frac{\sigma^2}{P} D_{\|h\|}^{-2} \end{array} \right)^{-1} V^H \mathbb{E}(D_V^H),$$

where $\alpha_3'$ is a power normalization factor, $V=[v_1^T, v_2^T, \ldots, v_K^T]^T$ a channel quantization vector matrix of the channel direction vector according to a quantization, $D_V$ is a diagonal matrix whose (k,k)th element is cos θ, $D_E$ is a diagonal matrix whose (k,k)th element is sin θ, Nt is a number of transmission antennas of a base station, K is a number of users using a single reception antenna, $I_{Nt}$ is a unit matrix, $\sigma^2$ is a covariance of a noise matrix, P is a transmission power constraint, $D_{\|h\|}$ is a diagonal matrix whose (k,k)th element is $\|h_k\|$, $h_k$ is a channel vector of $k^{th}$ user, E(.) is an expectation, and $(.)^H$ is a Hermitian calculation.

10. The apparatus of claim 7, wherein the information on the error angle θ of the CDI is an average value of cos θ over a long period longer than a feedback period in which the feedback is transmitted, and
   wherein the average value of cos θ is transmitted per the long period.

11. The apparatus of claim 10, wherein the precoding matrix is generated based on the cos θ by Equation below:

$$G_{CDI,SNR,\cos\theta} = \alpha'_3 \left( \begin{array}{c} V^H \mathbb{E}(D_V^2)V + \\ \mathbb{E}(D_E^2) \frac{1}{N_t - 1}(KI_{N_t} - V^H V) + \\ \frac{\sigma^2}{P} D_{\|h\|}^{-2} \end{array} \right)^{-1} V^H \mathbb{E}(D_V^H),$$

where $\alpha_3'$ is a power normalization factor, $V=[v_1^T, v_2^T, \ldots, v_K^T]^T$ a channel quantization vector matrix of the channel direction vector according to a quantization, $D_V$ is a diagonal matrix whose (k,k)th element is cos θ, $D_E$ is a diagonal matrix whose (k,k)th element is sin θ, Nt is a number of transmission antennas of a base station, K is a number of users using a single reception antenna, $I_{Nt}$ is a unit matrix, $\sigma^2$ is a covariance of a noise matrix, P is a transmission power constraint, $D_{\|h\|}$ is a diagonal matrix whose (k,k)th element is $\|h_k\|$, $h_k$ is a channel vector of $k^{th}$ user, E(.) is an expectation, and $(.)^H$ is a Hermitian calculation.

12. The apparatus of claim 7, wherein the channel quantization error component is calculated by Equation below:

$$\theta_{quantization} = \cos^{-1}|\hat{h}_k^H v_k|,$$

where $\hat{h}_k$ is a channel estimated by $k^{th}$ user at reception end, $v_k$ is a codebook vector of a user, and $(.)H$ is a Hermitian calculation.

13. An apparatus for generating a precoding matrix in a wireless communication system, the apparatus comprising
   a radio frequency (RF) unit for transmitting or receiving a wireless signal; and
   a processor connected to the RF unit, and configured to:
      receive a feedback including information on an error angle θ of channel direction information (CDI) which indicates a direction of channel direction vector from a terminal, and
      generate a precoding matrix based on the information on the error angle θ of the CDI,
   wherein the error angle θ of the CDI indicates an angle between the channel direction vector and a quantized channel direction vector,
   wherein the error angle θ of the CDI includes at least one of a channel quantization error component, a channel feedback delay error component and a channel estimation error component, and
   wherein the information on the error angle θ of the CDI is an average value of cos θ over a long period longer than a feedback period in which the feedback is transmitted, and
   wherein the average value of cos θ is transmitted per the long period and wherein the channel quantization error component is calculated by Equation below:

$$\theta_{quantization} = \cos^{-1}|\hat{h}_k^H v_k|,$$

where $\hat{h}_k$ is a channel estimated by $k^{th}$ user at reception end, $v_k$ is a codebook vector of a user, and $(.)H$ is a Hermitian calculation.

14. The apparatus of claim 13, wherein the precoding matrix is generated based on the cos θ by Equation below:

$$G_{CDI,SNR,\cos\theta} = \alpha'_3 \left( \begin{array}{c} V^H \mathbb{E}(D_V^2)V + \\ \mathbb{E}(D_E^2) \frac{1}{N_t - 1}(KI_{N_t} - V^H V) + \\ \frac{\sigma^2}{P} D_{\|h\|}^{-2} \end{array} \right)^{-1} V^H \mathbb{E}(D_V^H),$$

where $\alpha_3'$ is a power normalization factor, $V=[v_1^T, v_2^T, \ldots, v_K^T]^T$ a channel quantization vector matrix of the channel direction vector according to a quantization, $D_V$ is a diagonal matrix whose (k,k)th element is cos θ, $D_E$ is a diagonal matrix whose (k,k)th element is sin θ, Nt is a number of transmission antennas of a base station, K is a number of users using a single reception antenna, $I_{Nt}$ is a unit matrix, $\sigma^2$ is a covariance of a noise matrix, P is a transmission power constraint, $D_{\|h\|}$ is a diagonal matrix whose (k,k)th element is $\|h_k\|$, $h_k$ is a channel vector of $k^{th}$ user, E(.) is an expectation, and $(.)^H$ is a Hermitian calculation.

15. The apparatus of claim 13, wherein the channel direction vector and the quantized channel direction vector have a relationship of Equation below:

$$\tilde{h}_k = \cos\theta_k \cdot v_k + \sin\theta_k \cdot e_k,$$

where $\tilde{h}_k$ is the channel direction vector on $k^{th}$ user, $v_k$ is the quantized channel direction vector on $k^{th}$ user, $e_k$ is an error vector on $k^{th}$ user, and $\theta_k$ is the error angle on $k^{th}$ user.

* * * * *